Aug. 30, 1955

J. H. STAAK 2,716,579

THRUST COLLAR

Filed Nov. 5, 1952

Inventor:
Julius H. Staak,
by Robert G. Irish
His Attorney.

United States Patent Office 2,716,579
Patented Aug. 30, 1955

2,716,579
THRUST COLLAR

Julius H. Staak, Fort Wayne, Ind., assignor to General Electric Company, a corporation of New York Application November 5, 1952, Serial No. 318,934

4 Claims. (Cl. 308—163)

This invention relates to devices for cushioning end thrust and limiting end play of rotating shafts.

In the design of rotating machinery, it is frequently desirable to provide for cushioning the end thrust and limiting end play of a rotating shaft. In small machines, for example, fractional horsepower motors, it is desirable that these two functions be formed by a single device, and it is further desirable that this device be readily assembled on the shaft.

It is, therefore, an object of this invention to provide an improved thrust collar for a rotatable shaft incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a thrust collar is provided having spaced apart sleeve portions embracing the shaft and an enlarged portion connecting the sleeve portions and defining an annular cavity with the shaft. An annulus of resilient material, such as rubber or neoprene, is positioned in the cavity and the enlarged portion is crimped at one or more locations on its outer periphery, thus displacing the resilient annulus at those locations thereby causing the remaining portions of the annulus to expand into tight engagement with the enlarged portion and the shaft to secure the collar to the shaft. The collar may be provided with a cup-shaped portion on the end of one of the sleeve portions in which a thrust washer is arranged to thereby provide the end thrust cushioning.

Figure 1:
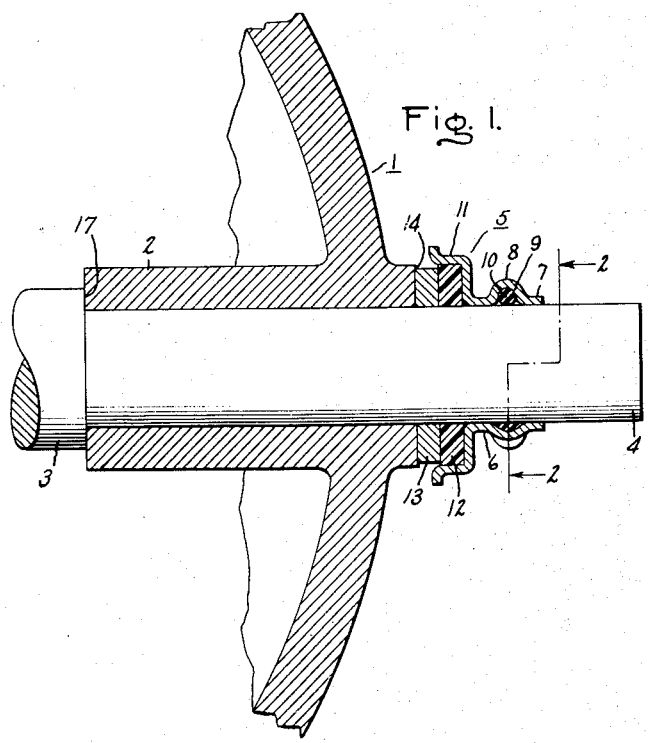
Figure 2:
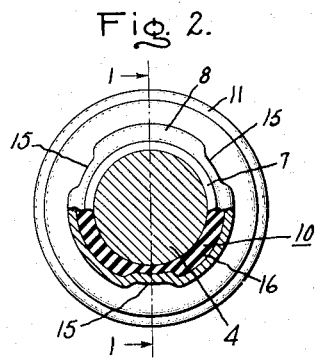

In the drawing, Fig. 1 is a fragmentary side elevational view, partly in section, illustrating the improved thrust collar of this invention; and Fig. 2 is a cross-sectional view taken along the line 2—2 of Fig. 1.

Referring now to Fig. 1, there is shown a stationary member 1 of a rotating machine, such as the end shield of a fractional horsepower motor, having a bearing 2 formed integrally therewith. A rotating shaft 3 having a shoulder 17 is seated in the bearing 2 and has extension 4 extending therefrom. It will be readily apparent that it is desirable to provide a device for cushioning end thrust which may be applied to the shaft extension 4 and also to limit the end play of the shaft. In the past, end thrust cushioning and end play limiting devices have been secured to shafts in various manners such as by set screws. However, considerable difficulty has been experienced due to improper locking of the device on the shaft and further because this locking may depend on tolerances of a slot or groove in shaft.

In order to eliminate the difficulties mentioned above and to provide a device which may be slid onto the shaft with a loose fit, thus preventing scoring of the shaft, and which may be secured to the shaft with hand tools so that several hundred pounds of pressure are required for removal, the device now to be described is provided. The improved thrust collar 5 of this invention comprises spaced apart sleeve portions 6 and 7 integrally joined by an enlarged portion 8. The sleeve portions 6 and 7 loosely embrace the shaft extension 4 so that the thrust collar 5 may be readily slipped thereon while the enlarged portion 8 defines an annular cavity 9 with the circumferential surface of the shaft extension 4. An annulus 10 of suitable resilient material, such as rubber or neoprene, is arranged in the annular cavity 9 of thrust collar 5 prior to its assembly on the shaft extension 4. Thrust collar 5 is also provided with a cup-shaped portion 11 formed on the end of sleeve portion 6 in which a suitable thrust washer 12 is positioned. Another washer 13, such as a steel washer, is interposed between thrust washer 12 and the end 14 of bearing 2.

After assembly on the shaft extension 4, the enlarged portion 8 of thrust collar 5 is crimped at one or more locations on its outer periphery, as at 15. This crimping operation can be easily performed with suitable hand tools and it will be readily seen that displacement of the resilient annulus 10 at the crimped locations 15 causes the remaining portions 16 to expand into tight engagement with the inner surface of enlarged portion 8 and the outer surface of shaft extension 4, thereby tightly securing thrust collar 5 in the desired position on shaft extension 4.

It will now be readily apparent that this improved thrust collar device can be readily assembled on the shaft without the requirement for grooving or slotting the shaft and can be secured thereto to provide the desired amount of end play with ordinary hand tools. Once secured, this device is firmly locked to the shaft and cannot be removed without the application of several hundred pounds pressure.

While I have disclosed and illustrated a specific embodiment of this invention, further modifications and improvements will occur to those skilled in the art. I desire, therefore, that this invention not be limited to the form shown and I intend in the appended claims to cover all modifications which do not depart from the spirit and scope of this invention.

What I claim as new and desire to secure by Letters Patent of the United States is:

1. In combination with a rotatable shaft, a thrust collar arranged on said shaft having spaced apart sleeve portions embracing said shaft and an enlarged portion connecting said sleeve portions and defining an annular cavity with said shaft, and an annulus of resilient material positioned in said cavity, said enlarged portion being crimped at at least one location on its outer periphery displacing said resilient annulus at said location thereby causing the remaining portions of said annulus to expand into tight engagement with said enlarged portion and said shaft whereby said thrust collar is secured to said shaft.

2. In combination with a rotatable shaft, a thrust collar arranged on said shaft having two spaced apart sleeve portions embracing said shaft and an enlarged portion integrally connecting said sleeve portions and defining an annular cavity with said shaft, and an annulus of resilient material positioned in said cavity, said enlarged portion being crimped at a plurality of locations on its outer periphery displacing said resilient annulus at said locations thereby causing the remaining portions of said annulus to expand into tight engagement with said enlarged portion and said shaft whereby said thrust collar is secured to said shaft.

3. In combination with a rotatable shaft, a thrust collar arranged on said shaft having spaced apart sleeve portions embracing said shaft and an enlarged portion connecting said sleeve portions and defining an annular cavity with said shaft, and an annulus of resilient material positioned in said cavity, said enlarged portion being crimped at at least one location on its outer periphery displacing said resilient annulus at said location thereby causing the remaining portions of said annulus to expand into tight engagement with said enlarged portion and said shaft whereby said thrust collar is secured to said shaft, one of said sleeve portions having a radial flange formed at its end remote from said enlarged portion for cushioning end thrust.

4. In combination with a rotatable shaft, a thrust collar arranged on said shaft having spaced apart sleeve portions embracing said shaft and an enlarged portion connecting said sleeve portions and defining an annular cavity with said shaft, an annulus of resilient material positioned in said cavity, said enlarged portion being crimped at at least one location on its outer periphery displacing said resilient annulus at said location thereby causing the remaining portions of said annulus to expand into tight engagement with said enlarged portion and said shaft whereby said thrust collar is secured to said shaft, one of said sleeve portions having a cup-shaped member formed at its end remote from said enlarged portion, and a thrust washer on said shaft positioned in said cup-shaped portion for cushioning end thrust.

References Cited in the file of this patent

UNITED STATES PATENTS

| Number | Name | Date |
|---|---|---|
| Re. 1,573 | Sellers | Nov. 24, 1863 |
| 67,852 | Dodge | Aug. 20, 1867 |
| 546,106 | Schmaltz | Sept. 10, 1895 |
| 1,756,167 | Avery | Apr. 29, 1930 |
| 1,840,039 | Joyce | Jan. 5, 1932 |
| 1,941,235 | Unke | Dec. 26, 1933 |
| 2,237,494 | McCormack | Apr. 8, 1941 |
| 2,463,695 | Jensen | Mar. 8, 1949 |
| 2,471,565 | Glocker | May 31, 1949 |
| 2,539,879 | Wightman | Jan. 30, 1951 |
| 2,616,733 | Strange | Nov. 4, 1952 |
| 2,618,684 | Bergan | Nov. 18, 1952 |